US005981292A

United States Patent [19]

Obenauf, Jr.

[11] Patent Number: 5,981,292

[45] Date of Patent: Nov. 9, 1999

[54] INSERT FOR SAMPLE CUP

[75] Inventor: Ralph H. Obenauf, Jr., Basking Ridge, N.J.

[73] Assignee: Metuchen Scientific Inc., Metuchen, N.J.

[21] Appl. No.: 09/008,557

[22] Filed: Jan. 16, 1998

[51] Int. Cl.$^{6}$ .............................. G01N 1/00; B01L 3/00

[52] U.S. Cl. ........................ 436/175; 220/501; 220/555; 220/654; 141/331; 141/340; 422/102; 422/99; 422/100; 436/180

[58] Field of Search .................................. 422/100, 102, 422/104, 99; 141/331, 340; 220/501, 555, 654; 436/175, 180

[56] References Cited

U.S. PATENT DOCUMENTS

| | | | |
|---|---|---|---|
| 2,767,744 | 10/1956 | Beerman | 141/319 |
| 4,698,210 | 10/1987 | Solazzi | 422/102 |
| 5,019,243 | 5/1991 | McEwen et al. | 210/94 |
| 5,096,062 | 3/1992 | Burkardt et al. | 206/361 |
| 5,707,589 | 1/1998 | Fullermann | 422/99 |
| 5,871,700 | 2/1999 | Konrad | 422/102 |

*Primary Examiner*—Long V. Le
*Assistant Examiner*—Patricia Bex
*Attorney, Agent, or Firm*—Fish & Neave; Jeffrey H. Ingerman; Joel Weiss

[57] ABSTRACT

A sample cup insert has a tubular wall and a flange extending inwardly at an acute angle from the tubular wall. When the sample cup, into which the sample cup insert is inserted, is filled with sample and sealed by a film that forms a window through which the sample is analyzed, air bubbles collect under the film. The air bubbles are transferred under the flange of the sample cup insert, and out of the portion of the sample to be analyzed, by rotating the sample cup, and allowing the air bubbles to flow up the side of the sample cup insert over the flange, and then returning the sample cup to its original position, thereby trapping the air bubbles under the flange. The flange of the sample cup insert retains these air bubbles outside of the portion of the sample to be analyzed.

14 Claims, 8 Drawing Sheets

INSERT FOR SAMPLE CUP

BACKGROUND OF THE INVENTION

This invention relates to sample cups used to hold samples for analysis by X-ray fluorescence ("XRF") spectrometers. In particular, this invention relates to an insert for such sample cups, which insert aids in the elimination of bubbles from liquid samples.

Sample cups, typically, are made from a suitable material such as polyethylene, and have a cylindrical body that can be open from one end or both ends. A respective collar, generally made from the same material as the body, preferably is provided for closing each open end with a preferably transparent thin film. The collar locks into a suitable detent on the body. The sample cup with one open end is used by adding the sample to the body, covering the open end with the thin film, and fastening the thin film by snapping the collar over the film and into the detent on the body. This captures the thin film, creating a taut, preferably transparent window. If the cup has two open ends, one end is sealed with the film and collar prior to the introduction of the sample and sealing of the second end. The sample cup is then placed in the XRF spectrometer and analyzed. Depending on the type of instrument, the X-ray source directs a beam, preferably into the center of the sample cup, either from above or from below.

In such known sample cups, air bubbles may be trapped under the film during sealing of the cup. When the sample cup is used with instruments in which the beam is directed into the sample from above, if such bubbles rest near the center of the cup, they may interfere with the X-ray beam, thereby spoiling the analysis. In addition, regardless of the type of sample cup, even if the sample is initially bubble-free, bubbles may form as a result of outgassing from the sample. In one known attempt to deal with the problem of air bubbles, sample cups were constructed with special ports for the introduction of syringes for the purpose of removing the air bubbles. This method of air bubble removal, however, was time-consuming, difficult to reproduce from sample to sample, messy, caused the cell to become unbalanced due to the uneven distribution of the weight caused by the hole and seal, and risked contamination of the sample.

In view of the foregoing, it would be desirable to provide a sample cup insert that permits the user to substantially eliminate the air bubbles from within the portion of the sample to be analyzed.

It would further be desirable to provide a sample cup insert that permits the user to substantially eliminate the air bubbles from within the portion of the sample to be analyzed quickly and easily.

It would be still further desirable to provide a sample cup insert that permits the user to eliminate the air bubbles from the portion of the sample to be analyzed after the sample is sealed inside the sample cup, so that substantially no additional air bubbles can enter the portion of the sample to be analyzed.

It would yet further be desirable to provide a sample cup insert that is adapted for use in known sample cups, thereby allowing the user to use the invention with sample cups that can alternatively be used for powder and paste samples as well.

SUMMARY OF THE INVENTION

It is an object of this invention to provide a sample cup insert that permits the user to substantially eliminate the air bubbles from within the portion of the sample to be analyzed.

It is a further object of this invention to provide a sample cup insert that permits the user to substantially eliminate the air bubbles from within the portion of the sample to be analyzed quickly and easily.

It is a still further object of this invention to provide a sample cup insert that permits the user to substantially eliminate the air bubbles from the portion of the sample to be analyzed after the sample is sealed inside the sample cup, so that substantially no additional air bubbles can enter the sample.

It is yet a further object of this invention to provide a sample cup insert that is adapted for use in known sample cups, thereby allowing the user to use the invention with sample cups that can alternatively be used for powder and paste samples as well.

In accordance with this invention, a sample cup insert for a sample cup having an inner diameter is provided. The sample cup insert has a tubular wall, having an inner radius and inner diameter, an outer diameter, and an inner surface. The tubular wall defines a central longitudinal axis. The outer diameter of the tubular wall is at most equal to the inner diameter of the sample cup. The sample cup insert also has a flange, having a flange width, the flange extending from a circumferential line of attachment on the inner surface of the tubular wall inwardly toward the central longitudinal axis of the insert, forming an acute flange angle with the tubular wall.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
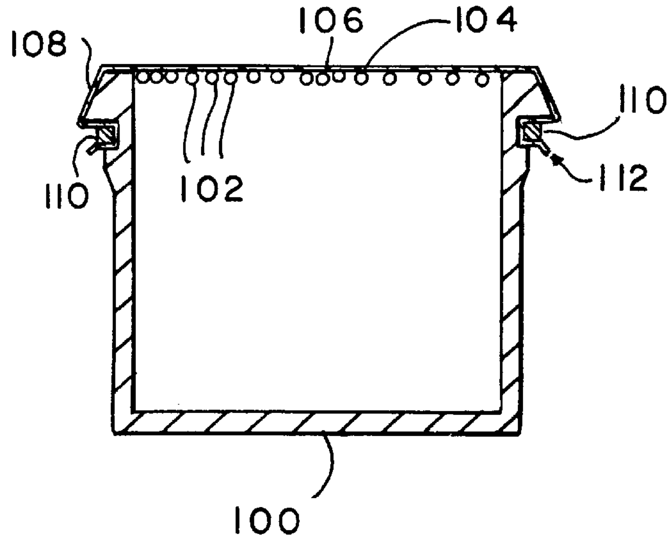
FIG. 1 is a cross-sectional view of a previously known sample cup filled with a sample, and sealed by a thin film, showing air bubbles at the top of the sample.
Figure 2:
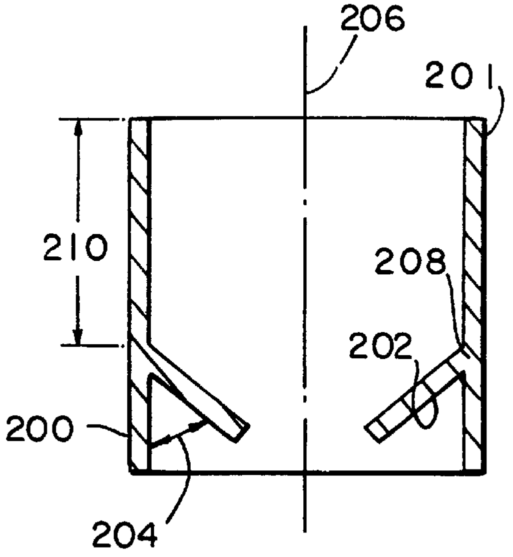
FIG. 2 is a cross-sectional view of the sample cup insert according to the present invention.
Figure 3:
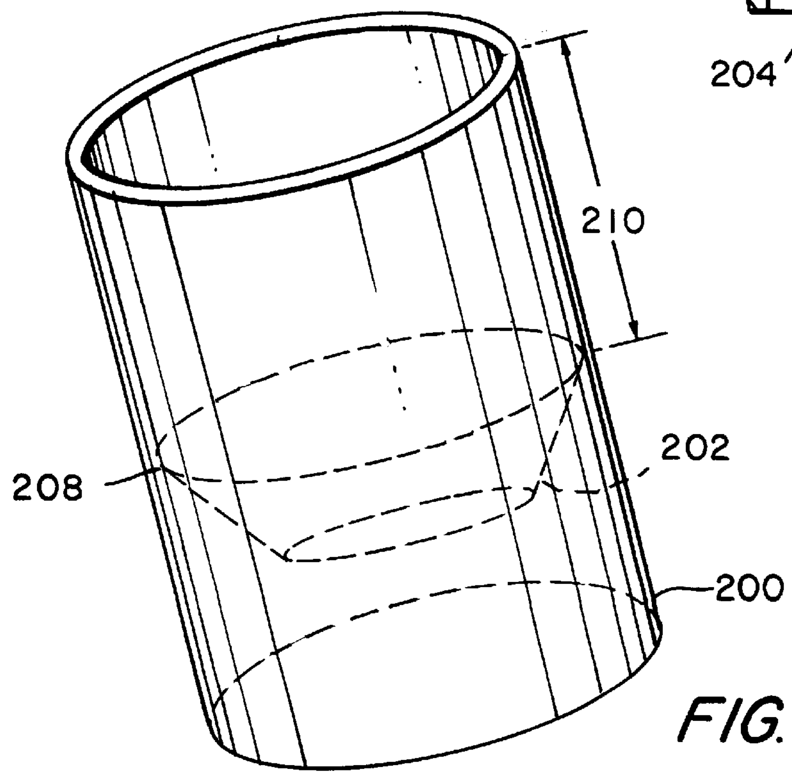
FIG. 3 is a perspective view of the insert of FIG. 2.
Figure 5:
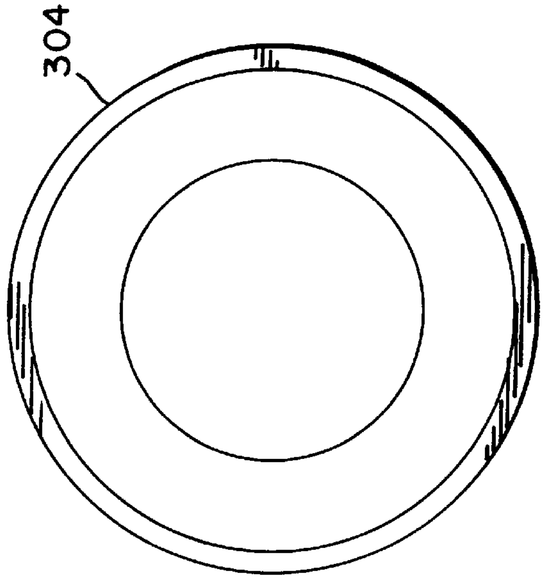
FIG. 5 is a top plan view of the sample cup insert of FIGS. 2–4.

The present invention solves the problem found in known sample cups in which air bubbles are trapped inside the sample cup during the analysis of the sample. The problem occurs, as described above, when these air bubbles float into the area of analysis of the sample and spoil the analysis.

According to the present invention, a sample cup insert is provided with a flange extending from its inner wall at an acute angle. The flange retains any trapped air bubbles outside the portion of the sample being analyzed.

The insert is placed in a sample cup. The sample cup is then filled with sample. When the cup is being filled, as soon as the liquid level reaches the bottom of the flange, air is trapped under the flange. After the sample has reached at least half the distance between top of the flange and the top of the sample cup, the air trapped under the flange can be removed so that there is room under the flange for air bubbles introduced during the sealing of the sample in the sample cup.

To remove the air bubbles trapped during the filling process, the sample cup is rotated at least until the rotation angle exceeds the acute angle between the flange and the wall of the insert. This allows the air bubbles that collected under the flange to float out from under the flange and escape.

In one embodiment of the invention, one or more gussets may divide the space under the flange into sectors. In that case, air will have been removed only from one sector. In such a case, air bubbles under a second sector of the flange may remain trapped under the flange. Therefore, the sample cup may then be rotated in an opposite direction at least until the rotation angle exceeds the angle of the flange in the second direction. This second rotation permits the air bubbles that collected under the second sector of the flange during the filling procedure to escape before the sample cup is sealed. The rotations may have to be repeated for additional sectors.

Some XRF spectrometers may spin the sample about its central longitudinal axis during analysis. Accordingly, the gussets are located preferably equiangularly about the central longitudinal axis of the insert, to prevent the sample cup from becoming unbalanced during spinning.

For removal of air bubbles as described to be effective, the sample cup should preferably be filled at least to a point halfway between the flange and the top of the sample cup. If the sample cup is not filled to that point, then when the sample cup is rotated in an attempt to remove air from the space under the flange, the space under the flange will continue to be exposed to air. The liquid level should preferably reach at least to a point halfway between the flange and the top of the sample cup. Then there is enough liquid that even rotation of the sample cup by the flange angle will not expose the space under the flange to air.

Alternatively, as soon as the top of the flange has been covered with liquid, substantially all of the trapped air can be removed by shaking the sample cup horizontally. However, this method, while empirically effective, is not theoretically as reliable as the method described above.

Once air has been removed from under the flange, the sample cup is completely filled and sealed with a thin film, which can trap other air bubbles. Bubbles may also form under the film as a result of outgassing from the sample. To remove these air bubbles trapped under the thin film from the portion of the sample to be analyzed, the sample cup, after being sealed, is inverted to an angle which is the sum of the acute flange angle plus 90°. Any air bubbles trapped under the thin film flow up the side of the cup and over the flange to the highest corner of the cup in the inverted position. The cup is then returned to its original position. The air bubbles start to move up the side of the cup, in an attempt to return to their original position at the top of the cup, but are retained under the flange.

When the cup is placed in the spectrometer, the flange is angled downward with the air bubbles trapped underneath the flange. The portion of the sample to be analyzed, about the center of the sample cup, is substantially bubble-free.

The X-ray beam analyzes the portion of the sample in the center of the sample cup. Any obstruction of the central portion of the sample interferes with the analysis. Thus, the edges of the flange preferably should not extend into the center of the sample cup. However, the flange should preferably extend sufficiently to permit the area under the flange to trap sufficient air bubbles.

These competing considerations determine both the flange angle and the width of the flange. For a given width of flange, a larger flange angle increases the horizontal projection of the flange, and therefore, one would expect, the amount of air that can be trapped. However, if the flange angle becomes too large—e.g., approaching 90°—air will be able to more easily escape from under the flange. Preferably, the flange angle should be between about 50° and about 80°, most preferably about 65°. Similarly, the width of the flange should be between about 30% and about 90% and most preferably about 75% of the inner radius of the insert so that the horizontal projection of the flange is between about 23% and about 89%, most preferably about 68% of the inner radius of the insert.

FIG. 1 shows a sealed sample cup 100 without the insert according to the invention, and exemplifies the problem to which the invention is addressed. Sample cup 100 is filled with sample 106 and preferably covered with a thin film 104. Film 104 preferably is secured by a snap-ring 110 which preferably fits a detent 112 below a collar 108 of sample cup 100. Air bubbles 102 float along thin film 104 covering the top of the sample cup 100. Air bubbles 102 are not confined to any one place. Rather, they float along the top of sample 106. When the X-ray beam used to analyze sample 106, passes through sample 106, the beam may be partially scattered or depleted by air bubbles 102, spoiling the analysis.

FIGS. 2–5 show a preferred embodiment of a sample cup insert 200 according to the invention. Sample cup insert 200 preferably has a flange 202 that is fixed to insert 200 along a circumferential attachment line 208, at an acute flange angle 204 with respect to the tubular wall 201. A central longitudinal axis 206 passes through the center of insert 200.

Figure 6:
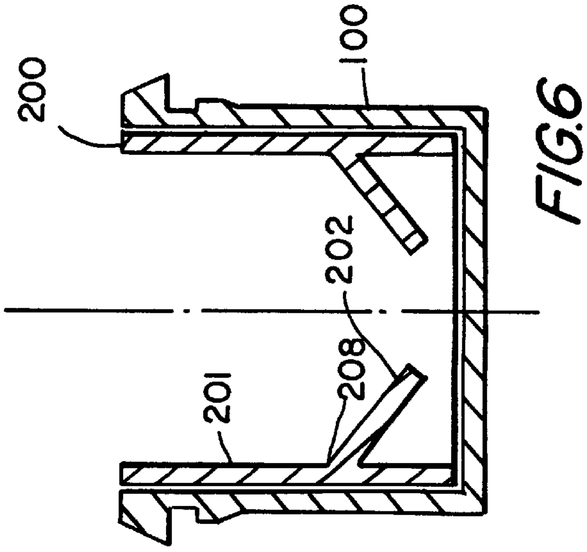
FIG. 6 is a cross-sectional view of the sample cup insert of FIGS. 2–5 inserted into a sample cup.
Figure 4:
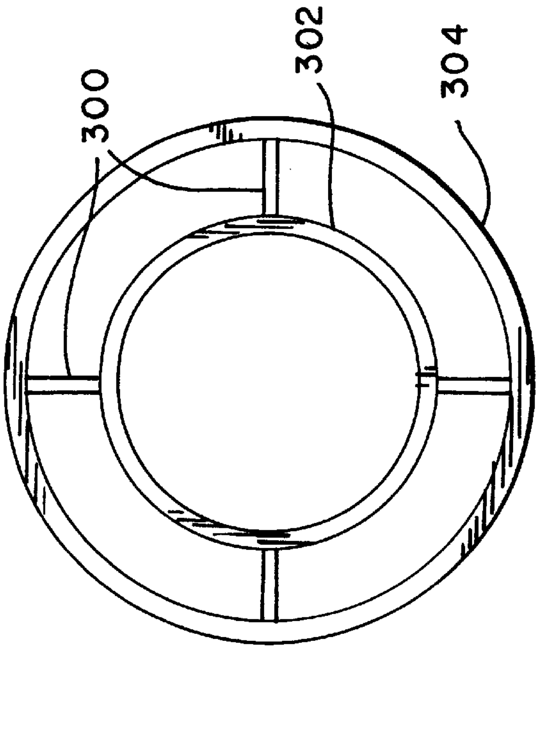
FIG. 4 is a bottom plan view of the sample cup insert of FIGS. 2 and 3.

Once sample cup insert 200 has been inserted into sample cup 100, as shown in FIG. 6, the combination is prepared to be filled with a sample.

Figure 7:
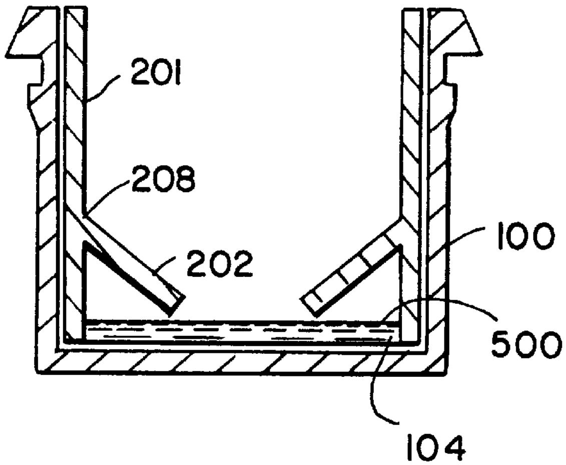
FIG. 7 is a cross-sectional view of a sample cup into which the sample cup insert has been inserted containing a small amount of sample.
Figure 8:
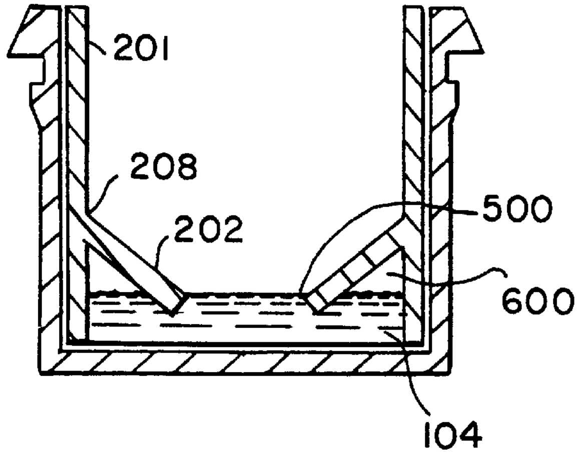
FIG. 8 is a cross-sectional view of the sample cup and sample cup insert of FIG. 7 containing a larger amount of sample.
Figure 9:
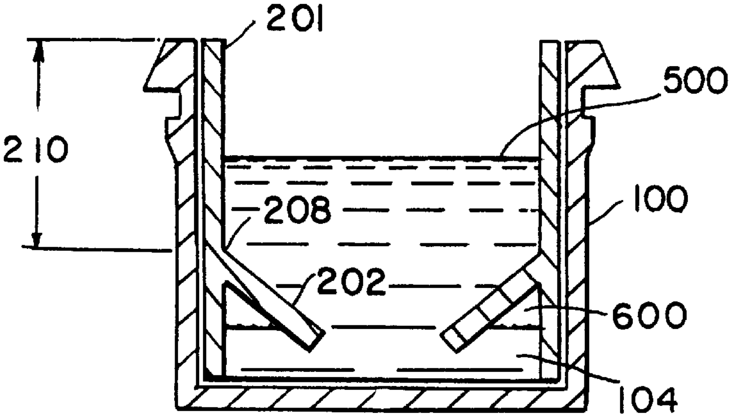
FIG. 9 is a cross-sectional view of the sample cup and sample cup insert of FIGS. 7 and 8 containing a still larger amount of sample.
Figure 10:
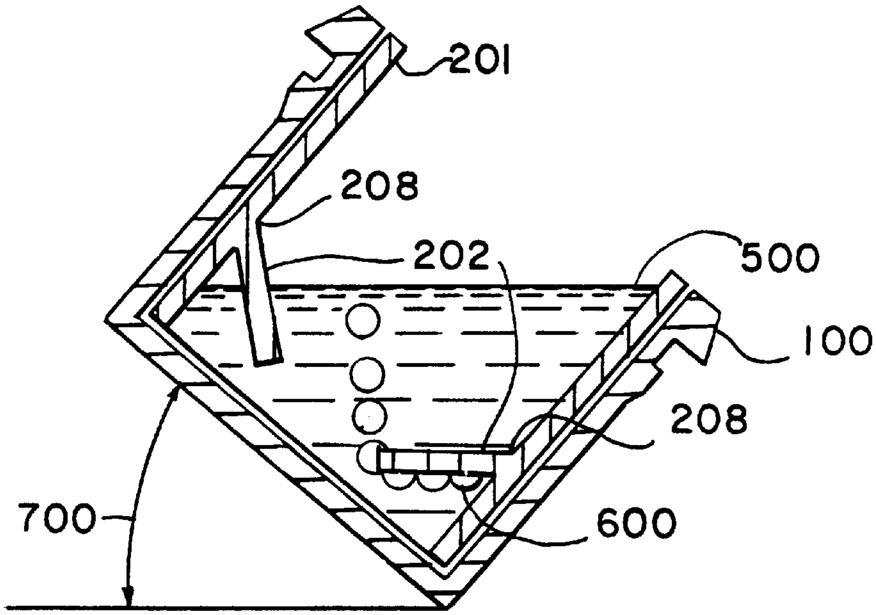
FIG. 10 is a cross-sectional view of the sample cup and sample cup insert of FIGS. 7–9 rotated in a first direction.

As the sample is being poured into sample cup 100 into which sample cup insert 200 has been inserted, and the top of sample 500 covers the bottom edge of flange 202, air 600 will inevitably be trapped under flange 202. (See FIGS. 7–9). Air 600 that collects during the filling process can be removed, preferably, by the following procedure: First, sample cup 100 into which sample cup insert 200 has been inserted is preferably filled until at least half the distance 210 between circumferential attachment line 208 and top of sample cup 100 has been covered. (See FIG. 9). Next, sample cup 100 is rotated as in FIG. 10 to one side to allow air 600 to escape from under one side of flange 202. For air 600 to escape, sample cup 100 should preferably be rotated by an angle 700 exceeding flange angle 204.

Figure 11:
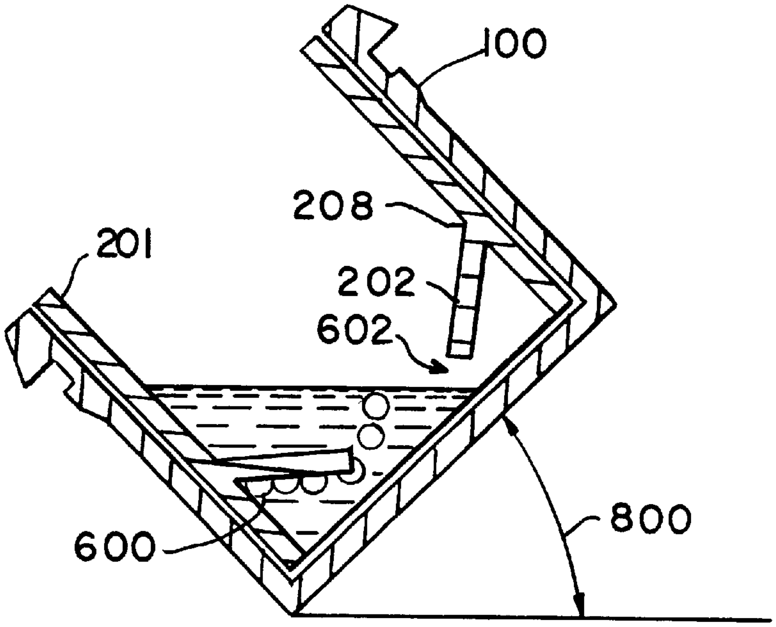
FIG. 11 is a cross-sectional view of the sample cup and sample cup insert of FIGS. 7–10.

As shown in FIG. 11, if sample cup 100 is not filled to a point halfway between circumferential attachment line 208 and the top of sample cup 100, then when sample cup 100 is rotated by angle 800, the space underneath flange 202 will be exposed to air at opening 602, so that it would be substantially impossible to remove air from under flange 202.

After air has been removed from under flange 202, sample cup 100 is then filled completely with sample 500. Afterwards, thin film 104 is placed over the full sample cup 100, and affixed by the snap-ring 110. At this point, air bubbles 102 may have been introduced during sealing. The invention allows removal of any such air bubbles 102 from the area of analysis of sample cup 100, and for trapping of air bubbles 102 under flange 202 during the XRF analysis.

Figure 12:
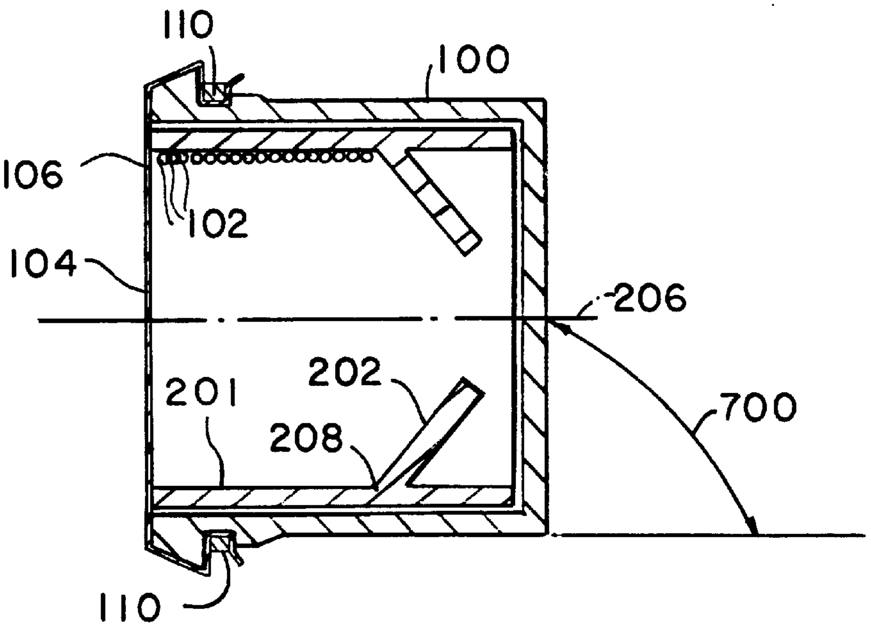
FIG. 12 is a cross-sectional view of a filled sample cup and sample cup insert rotated 90°.
Figure 13:
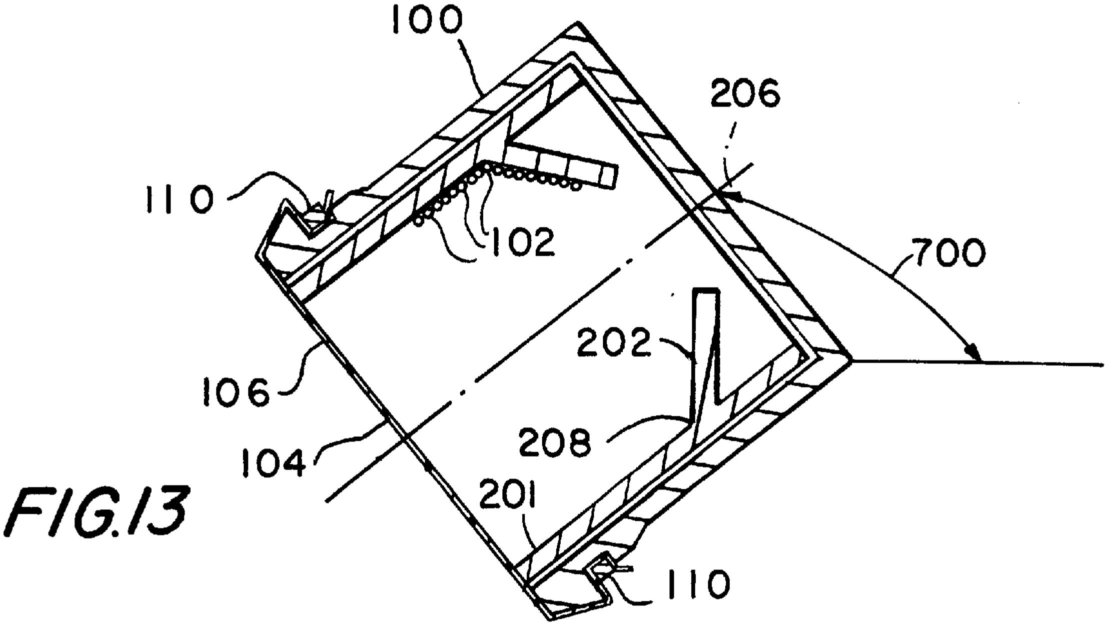
FIG. 13 is a cross-sectional view of the filled sample cup and sample cup insert of FIG. 12 rotated further.
Figure 14:
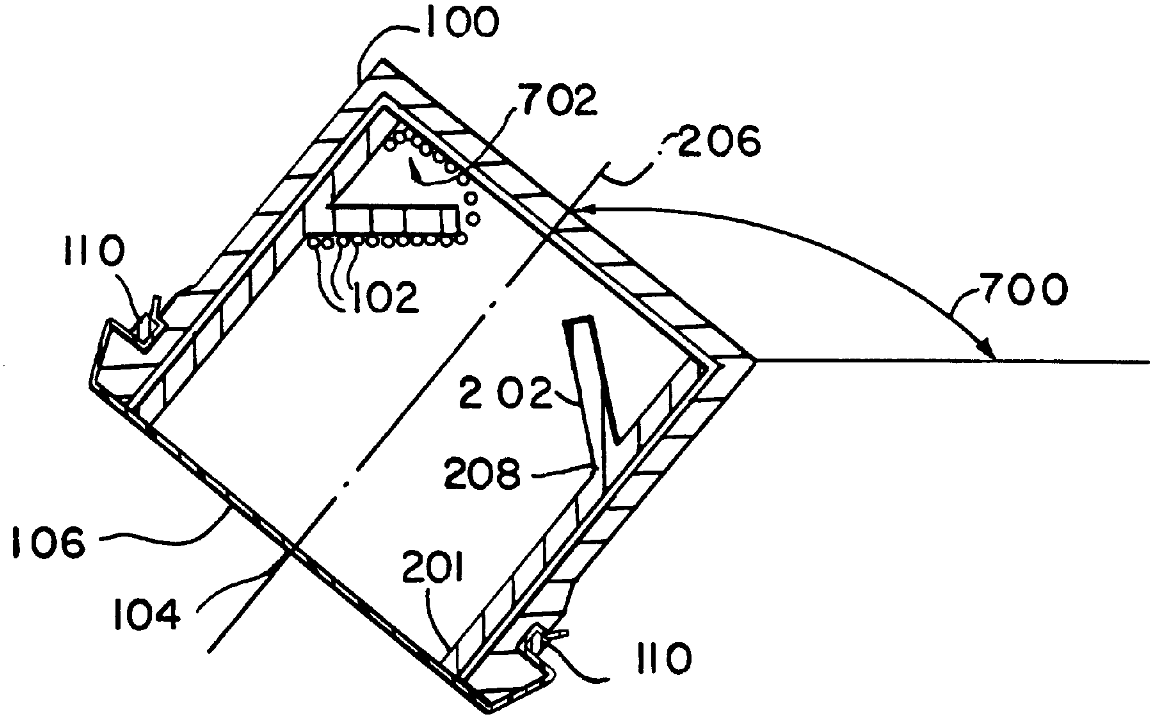
FIG. 14 is a cross-sectional view of the filled sample cup and sample cup insert of FIGS. 12 and 13 rotated still further.

Once sample cup 100 has been sealed with insert 200 inside, as shown in FIGS. 12–14, any air bubbles 102 can be transferred under flange 202, and out of the way of the X-ray beam, by rotating sealed sample cup 100 such that the rotation angle 700 of sample cup 100 exceeds the sum of flange angle 204 plus 90°.

As sample cup 100 is rotated, air bubbles 102 flow up tubular wall 201. When rotation angle 700 exceeds the sum of flange angle 204 plus 90°, air bubbles 102 rise over flange 202 and into the highest corner 702 of inverted sample cup 200.

Following the rotation of the sample cup 100, sample cup 100 is returned to its original position. As air bubbles 102 attempt to rise from corner 702 to the top of sample cup 100, they push into the vertex of flange angle 204. Air bubbles 102 stay trapped in the vertex of flange angle 204, under flange 202, as long as sample cup 100 remains in its original position.

Figure 15:
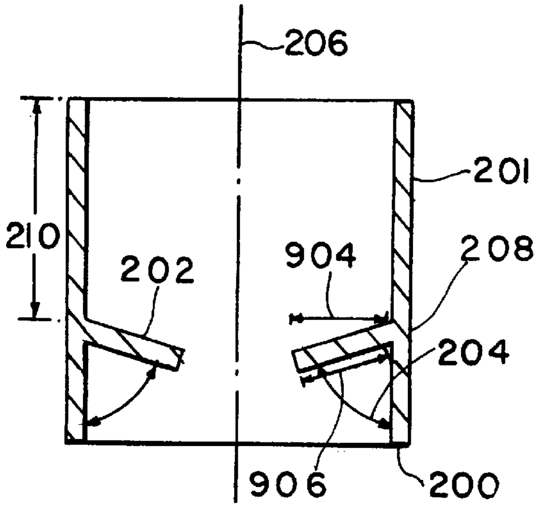
FIG. 15 is a cross-sectional view of the insert of FIGS. 2–5 with the flange angle between 45° and 90°.
Figure 16:
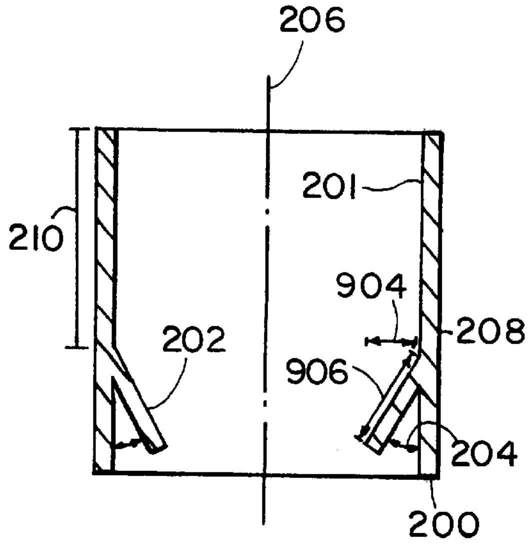
FIG. 16 is a cross-sectional view of the sample cup insert of FIGS. 2–5 and 15, with a flange angle between 0° and 45°.
Figure 17:
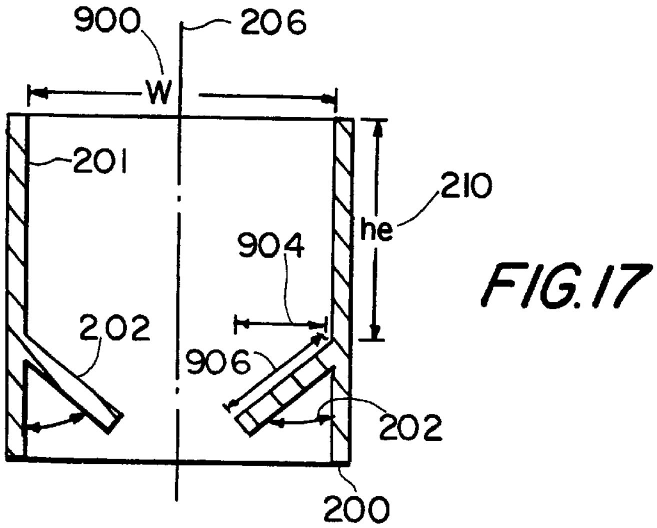
FIG. 17 is a cross-sectional view of the sample cup insert of FIGS. 2–5, 15 and 16.

FIGS. 15–17 show the effects of various flange angles 204. For flange angle 204 shown in FIG. 15, approaching 90°, more air is trapped under flange 202, but air more easily escapes from under flange 202. For flange angle 204 shown in FIG. 16, less air is trapped under flange 202 but air is less able to escape from under flange 202. Preferably, flange angle 204 should be between about 50° and about 80°, most preferably about 65°.

Similarly, the horizontal projection 904 of flange 202 increases as width of flange 202 increases, thereby trapping more air, but also projecting further into center of sample, possibly interfering with analysis. Width 906 of flange 202 should be preferably between about 30% and about 90%, and most preferably about 75%, of inner radius 900 of insert 200 so that the horizontal projection 904 of flange 202 is between about 23% and about 89%, and most preferably about 68% of inner radius 900 of insert 200.

Figure 18:
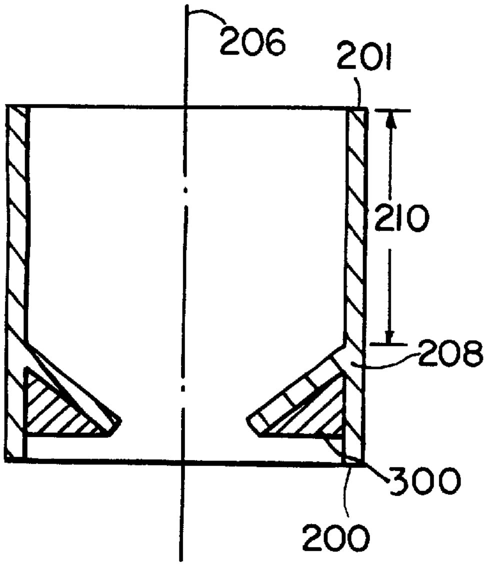
FIG. 18 is a cross-sectional view of the sample cup insert with gussets.
Figure 19:
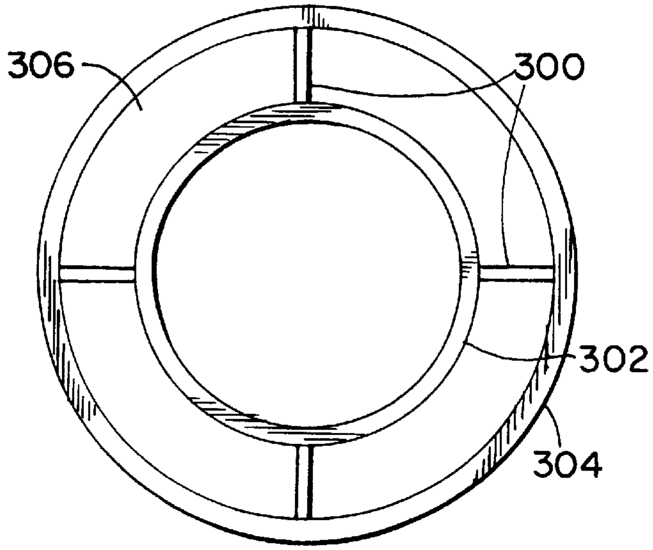
FIG. 19 is a bottom plan view of the sample cup insert of FIG. 18 with four equiangularly spaced gussets.
Figure 20:
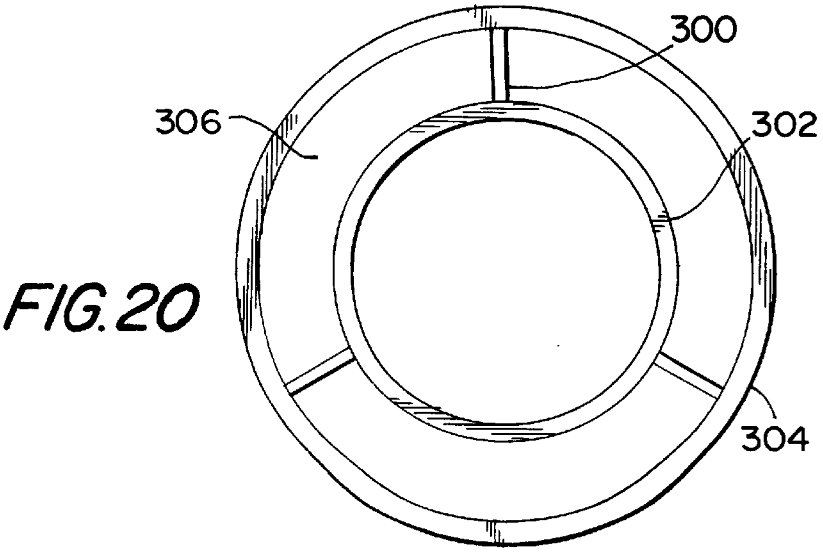
FIG. 20 is a bottom plan view of the sample cup insert of FIG. 18 with three equiangularly spaced gussets.

In another preferred embodiment of this invention illustrated in FIGS. 18–20, gussets 300 preferably extend from tubular wall 201 to flange 202, breaking up the space under flange 202 into sectors 306, making it easier to free air from under flange 202 during the filling process by limiting the ability of air trapped under flange 202 to move circumferentially rather than radially as the user rotates sample cup 100 to remove the trapped air. The user can free air from each individual sector 306 during the filling process by preferably rotating sample cup 100 along a substantially horizontal axis substantially transverse to a radial bisector of each respective sector 306.

Some XRF spectrometers may spin sample cup 100 about its longitudinal axis during analysis. Accordingly, if gussets 300 are provided, they should preferably be distributed substantially equiangularly (see FIGS. 19–20) about the central longitudinal axis of the insert. The substantially equiangular distribution of gussets 300 prevents imbalance when sample cup 100, into which sample cup insert 200 has been inserted, is spun.

Thus it is seen that a sample cup insert that permits the user to eliminate the air bubbles from the portion of the sample to be analyzed after the sample is sealed inside the sample cup, has been provided. One skilled in the art will appreciate that the present invention can be practiced by other than the described embodiments, which are presented for purposes of illustration rather than of limitation, and the present invention is limited only by the claims which follow.

What is claimed is:

1. An insert for a sample cup, the sample cup having an inner diameter, the insert comprising:

a tubular wall, having an inner radius and inner diameter, an outer diameter at most equal to the inner diameter of the sample cup, and an inner surface, and defining a central longitudinal axis; and a flange, having a flange width, extending from a circumferential line of attachment on the inner surface of the tubular wall inwardly toward the central longitudinal axis of the insert, forming a flange angle with the tubular wall, said flange angle being acute.

2. The insert of claim 1 wherein the flange angle is greater than 45°.

3. The insert of claim 2 wherein the flange angle is between about 50° and about 80°.

4. The insert of claim 3 wherein the flange angle is about 65°.

5. The insert of claim 1 wherein the flange angle is less than 45°.

6. The insert of claim 1 wherein the flange width is between about 30% and about 90% of said inner radius.

7. The insert of claim 6 wherein the flange width is about 75% of said inner radius.

8. The insert of claim 1 further comprising at least one gusset extending from the inner surface of the tubular wall to the flange.

9. The insert of claim 8 wherein the gusset is substantially perpendicular to the inner surface of the tubular wall.

10. The insert of claim 8 comprising at least two said gussets distributed substantially equiangularly about said central longitudinal axis of the tubular wall.

11. The insert of claim 1 having a height from the circumferential attachment line to the top of the sample cup at least equal to the quotient of the inner diameter of the tubular wall and the tangent of the flange angle.

12. A method for eliminating air bubbles from a sample cup having an area of analysis of a sample, an inner diameter, and a top comprising:

providing an insert, the insert including:

a tubular wall having an inner diameter, an outer diameter at most equal to the inner diameter of the sample cup, and an inner surface, and defining a central longitudinal axis, and a flange, having a flange width, extending from a circumferential line of attachment on the inner surface of the tubular wall inwardly toward the central longitudinal axis of the insert, forming a flange angle with the tubular wall, said angle being acute;

inserting the insert into the sample cup with the flange angled away from the top;

filling the sample cup with the sample;

sealing the sample cup with a thin film;

rotating the sample cup about a substantially horizontal axis from an original position in a first direction to a rotation angle which exceeds the sum of the flange angle plus 90°; and rotating the sample cup in a second direction, opposite the first direction, back to the original position, such that when the sample cup is returned to its original position, the air bubbles flow under the flange, and are retained outside the area of analysis.

13. The method of claim 12 wherein the sample cup has an upper rim at a distance from said circumferential attachment line, and wherein filling of the sample cup comprises:

filling the sample cup to at least half said distance from the circumferential attachment line to the upper rim;

rotating the sample cup about the substantially horizontal axis from an original position in a first direction to a rotation angle which exceeds the flange angle; and returning the sample cup to its original position.

14. The method of claim 12 wherein, when said insert has gussets extending from the flange to the inner surface of the tubular wall, forming sectors, and the sample cup has an upper rim at a distance from said circumferential attachment line, said filling of the sample cup comprises:

filling the sample cup to at least half said distance from the circumferential attachment line to the upper rim; and for each respective one of said sectors:

rotating the sample cup about the substantially horizontal axis substantially transverse to a radial bisector of said respective one of said sectors, thereby releasing trapped air from said respective one of said sectors, and returning the sample cup to its original position following said rotation.

* * * * *